(12) United States Patent
Fischer

(10) Patent No.: US 7,128,363 B2
(45) Date of Patent: Oct. 31, 2006

(54) CONVERTIBLE AUTOMOBILE

(75) Inventor: Jochem Fischer, Ostfildern (DE)

(73) Assignee: Benteler Automobil Technik GmbH, Paderborn (DE)

( * ) Notice: Subject to any disclaimer, the term of this patent is extended or adjusted under 35 U.S.C. 154(b) by 73 days.

(21) Appl. No.: 11/059,572

(22) Filed: Feb. 16, 2005

(65) Prior Publication Data

US 2005/0194811 A1 Sep. 8, 2005

(30) Foreign Application Priority Data

Mar. 3, 2004 (DE) .................... 10 2004 010 272

(51) Int. Cl.
*B60J 7/00* (2006.01)
(52) U.S. Cl. .................. 296/108; 296/203.03
(58) Field of Classification Search ................ 296/108, 296/193.06, 203.03
See application file for complete search history.

(56) References Cited

U.S. PATENT DOCUMENTS

| | | | | |
|---|---|---|---|---|
| 1,988,346 A * | 1/1935 | Wagner | ................ | 296/107.08 |
| 2,768,024 A * | 10/1956 | Spear, Jr. | ................ | 296/107.08 |
| 2,841,441 A * | 7/1958 | Evans | ................ | 296/117 |
| 4,708,389 A * | 11/1987 | Maebayashi et al. | .... | 296/107.2 |
| 4,729,592 A * | 3/1988 | Tuchiya et al. | ........ | 296/107.16 |
| 5,678,881 A * | 10/1997 | Tokarz | ........ | 296/108 |
| 6,139,094 A * | 10/2000 | Teply et al. | ........... | 296/203.03 |
| 6,315,349 B1 * | 11/2001 | Kinnanen | ................... | 296/108 |
| 6,347,828 B1 * | 2/2002 | Rapin et al. | ................ | 296/108 |
| 6,431,636 B1 * | 8/2002 | Schutt | ........ | 296/108 |
| 6,533,348 B1 * | 3/2003 | Jaekel et al. | ........... | 296/203.04 |
| 6,799,790 B1 * | 10/2004 | Sakai et al. | ............. | 296/146.8 |

FOREIGN PATENT DOCUMENTS

| | | |
|---|---|---|
| DE | 199 02 655 A1 | 12/1999 |
| DE | 101 34 439 C2 | 2/2003 |
| DE | 101 62 441 A1 | 7/2003 |

\* cited by examiner

*Primary Examiner*—Kiran B. Patel
(74) *Attorney, Agent, or Firm*—Henry M. Feiereisen

(57) ABSTRACT

A convertible includes a top having a foldable support structure made of metal sections articulated with one another. The metal sections are hot-formed and at least partially heat treated.

6 Claims, 1 Drawing Sheet

CONVERTIBLE AUTOMOBILE

CROSS-REFERENCES TO RELATED APPLICATIONS

This application claims the priority of German Patent Application, Serial No. 10 2004 010 272.4, filed Mar. 3, 2004, pursuant to 35 U.S.C. 119(a)–(d).

BACKGROUND OF THE INVENTION

The present invention relates, in general, to a motor vehicle, and more particularly to a convertible automobile, referred to hereinafter as "convertible".

Nothing in the following discussion of the state of the art is to be construed as an admission of prior art.

Although convertibles are typically derived of production vehicles, their body still is designed with numerous modifications to satisfy prescribed safety regulations. Despite various reinforcements, convertibles are inferior as far as safety is concerned because the absence of a hard roof and the connection to the vehicle body necessarily diminish stability and rigidity. Traditionally, convertibles have canvas tops with a foldable support structure which includes metal sections that are articulated to one another and covered by a canvas. Increasingly popular is the use of foldable roofs or tops which also include a foldable support structure of metal sections to support the convertible top of sheet metal.

German Pat. No. DE 101 34 439 C2 describes a convertible with a top having a foldable support structure made of metal sections which are articulated to one another. The metal sections are made by an internal high pressure forming process. German patent publication no. DE 101 62 441 A1 describes a process for making vehicle body components through a hot forming process by way of internal high pressure forming. In general, hot forming is a typical process used for making vehicle body parts, as, for example, also described in German patent publication no. DE 199 02 655 A1.

It would be desirable and advantageous to provide an improved convertible exhibiting superior stability and safety.

SUMMARY OF THE INVENTION

According to one aspect of the present invention, a convertible includes a top having a foldable support structure made of metal sections articulated with one another, wherein the metal sections are hot-formed and at least partially heat treated.

The term "heat treated" is used here in a generic sense and refers to any tempering process, involving the heating and cooling of a steel material in the solid state to provide certain strength properties. It will also be understood by persons skilled in the art that the terms "heat treated" and "tempered" or "quenched and tempered" are used synonymous in the disclosure.

The present invention resolves prior art problems by constructing the support structure of hot-formed metal sections, e.g. shell bodies, tubes or rods. The metal sections are made of high-strength steel material which is hot formed and at least partially heat treated and hardened. In this way, the strength and the stability of the top is greatly enhanced. The strength of the metal sections is suitably above 1,400 N/mm². In particular, when the top is closed, the overall safety for the vehicle occupants is significantly improved.

The hot-formed metal sections can be made from a starting material which is heated in a heat treatment facility to a hardening temperature, i.e. to a temperature above $Ac_3$ where steel is in an austenitic state. Typically, the temperature ranges between 775° C. and 1,000° C. Subsequently, the semi-finished product is shaped in a pressing tool and subsequently allowed to cool down for hardening. As a result, the metallic end product has a fine-grained martensitic or bainitic structure. Suitably, the metallic end product remains in the pressing tool during the hardening process Examples of a starting material for the metal sections include a blank or a semi-finished product of steel material containing, in weight percent, 0.18% to 0.3% of carbon (C), 0.1% to 1.0% of silicon (Si), 1% to 2.5% of manganese (Mn), 0.1% to 0.8% of chromium (Cr), 0.1% to 0.5% of molybdenum (Mo), 0.02% to 0.05% of titanium (Ti), 0.002% to 0.05% of boron (B), 0.01% to 0.06 of aluminum (Al), maximal 0.01% of sulphur (S), maximum 0.025% of phosphor, the remainder being iron (Fe) including incidental melt-based impurities.

According to another feature of the present invention, there may be provided a guide, and a B-pillar which is guided in the guide for vertical displacement, with the B-pillar being constructed for locking engagement with the support structure. As a consequence, the B-pillar can then be locked with the roof area, thereby providing added support so that the safety feature is enhanced in the event of a rollover.

There are many ways to realize a drive mechanism for the displacement of the B-pillar. Examples include a linear drive or a pneumatic drive. Currently preferred is the provision of a rack-and-pinion drive placed on the inside of the B-pillar for moving the B-pillar. The rack-and-pinion drive essentially includes a rack which is operated via a gear mechanism and an electric motor.

According to another feature of the present invention, a move-out safety mechanism may be provided for preventing foreign matters from getting jammed by the B-pillar. The safety mechanism may be implemented, for example, by a torque limitation of the drive motor for the rack-and-pinion drive.

According to another feature of the present invention, a pressure sensor may be disposed in a contact area of the B-pillar and the support structure. For example, the pressure sensor may be placed in the rubber weatherseal in the roof area. In the event, the contact pressure increases during move-out of the B-pillar beyond a predetermined limit value, the move-out operation of the B-pillar is inhibited through intervention of the pressure sensor and an associated control unit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
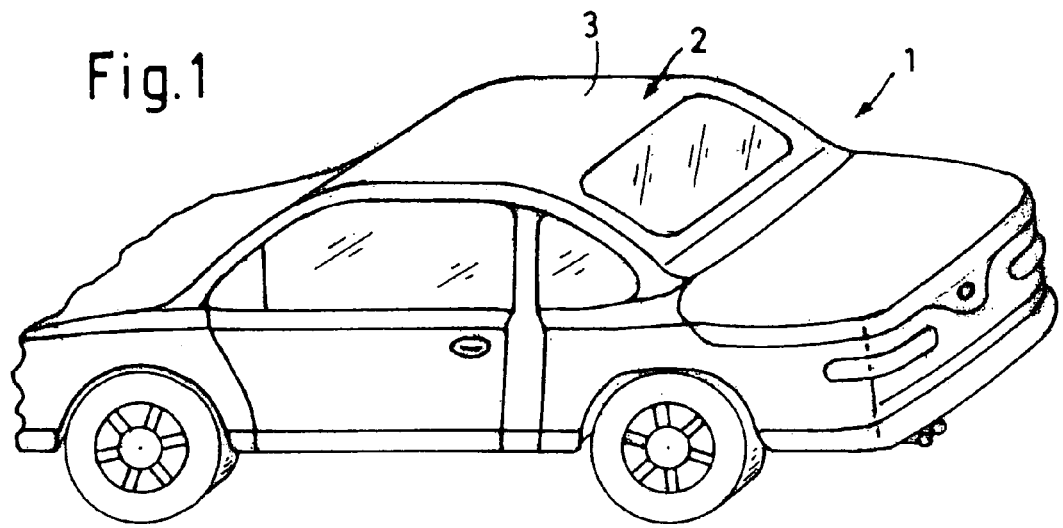
FIG. 1 is a top, side and rear perspective illustration of a convertible with a convertible top according to the present invention in closed state.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
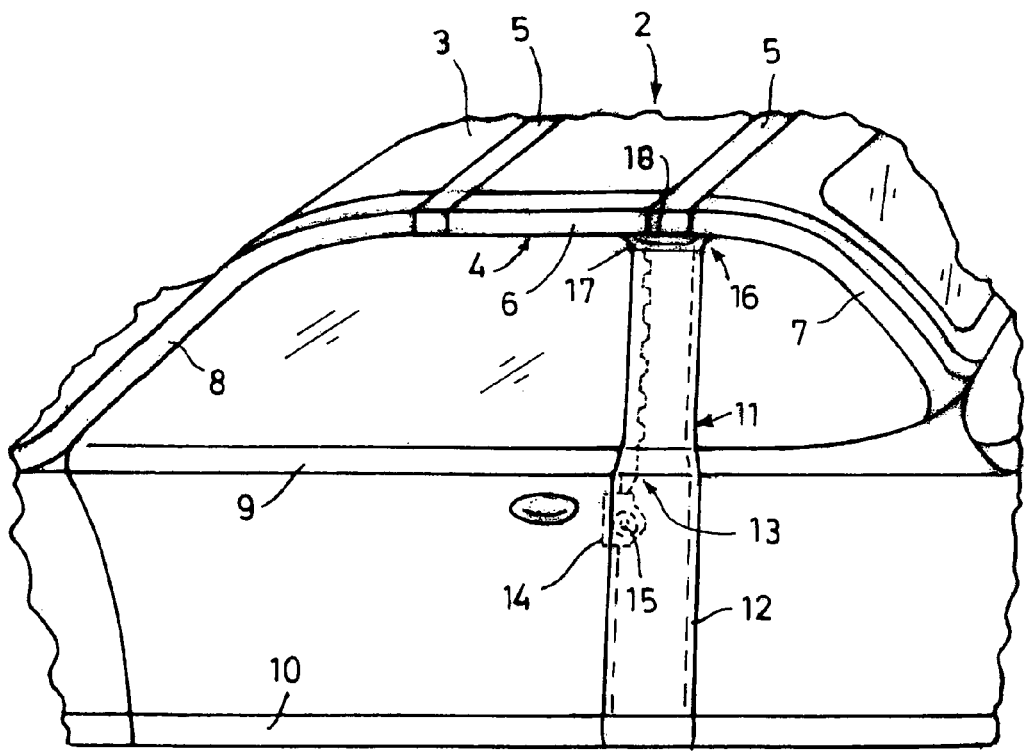
FIG. 2 is a fragmentary top and side perspective view of the convertible in the area of the B-pillar.

Turning now to the drawing, and in particular to FIG. 1, there is shown a top, side and rear perspective illustration of a convertible according to the present invention, generally designated by reference numeral 1 and having a convertible top generally designated by reference numeral 2. The top 1 essentially includes a canvas cover 3 which is stretched over a foldable support structure 4. As shown in FIG. 2, the support structure 4 includes plural metal sections 5, 6, 7 which are articulated to one another. The metal sections 5, 6, 7 are made of high strength or highest strength steel through a hot forming process with subsequent heat treatment. As a result, the metal sections 5, 6, 7 have a strength of more than 1,400 N/mm². An example of a starting material for the metal sections includes a blank or a semi-finished product of steel material containing, in weight percent, 0.18% to 0.3% of carbon (C), 0.1% to 1.0% of silicon (Si), 1% to 2.5% of manganese (Mn), 0.1% to 0.8% of chromium (Cr), 0.1% to 0.5% of molybdenum (Mo), 0.02% to 0.05% of titanium (Ti), 0.002% to 0.05% of boron (B), 0.01% to 0.06 of aluminum (Al), maximal 0.01% of sulphur (S), maximum 0.025% of phosphor, the remainder being iron (Fe) including incidental melt-based impurities.

The convertible 1 includes an A-pillar 8 which is also made of a high-strength steel material and hot formed and subsequently heat treated. Reference numeral 9 designates a door pillar, whereas reference numeral 10 designates a side sill. Further provided is a B-pillar 11 which is movable in a guide 12 in vertical direction. During normal travel, the B-pillar 11 is retracted, when the top 2 is open. The B-pillar 11 is operatively connected to a rack-and-pinion drive, generally designated by reference numeral 13 and including a drive motor 14 and a gear mechanism 15, for moving the B-pillar out. The drive motor 14 is operatively connected to a move-out safety mechanism in the form of a torque limiter in order to prevent foreign matters from being jammed by the B-pillar 11.

When the B-pillar 11 has reached the extended position, the B-pillar 11 is locked with the support structure 4. Disposed in the contact area 16 between the B-pillar 11 and the support structure 4 is a closure 17 with integrated pressure sensor 18. Through intervention of the pressure sensor 18, the move-out process of the B-pillar 11 can be inhibited or interrupted in the event of an inadmissible pressure rise. This measure further contributes to safety enhancement and prevents foreign matters from getting jammed.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A convertible comprising:
   a top having a foldable support structure made of metal sections articulated with one another, said metal sections being hot-formed and at least partially heat treated;
   a guide;
   a B-pillar which is guided in the guide for vertical displacement, said B-pillar being constructed for locking engagement with the support structure; and
   a rack-and-pinion drive placed on the inside of the B-pillar for moving the B-pillar.

2. The convertible of claim 1, and further comprising a move-out safety mechanism operatively connected to the B-pillar.

3. The convertible of claim 2, wherein the rack-and-pinion drive includes a rack operatively connected to the B-pillar, and an electric motor for driving the rack, said safety mechanism being constructed to limit a torque of the electric motor.

4. The convertible of claim 1, and further comprising a pressure sensor disposed in a contact area of the B-pillar and the support structure.

5. The convertible of claim 4, wherein the pressure sensor is placed in a rubber weatherseal in a roof area.

6. The convertible of claim 1, wherein the metal sections have a strength above 1,400 N/mm².

* * * * *